United States Patent
Subramaniam et al.

(10) Patent No.: US 12,393,862 B2
(45) Date of Patent: Aug. 19, 2025

(54) CREATING AND USING LEARNING MODELS TO IDENTIFY BOTNET TRAFFIC

(71) Applicants: AT&T Intellectual Property I, L.P., Atlanta, GA (US); AT&T Technical Services Company, Inc., Vienna, VA (US)

(72) Inventors: Ganesh Subramaniam, Bridgewater, NJ (US); Robert Archibald, Bridgewater, NJ (US); Richard Hellstern, Cranbury, NJ (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 1008 days.

(21) Appl. No.: 17/102,471

(22) Filed: Nov. 24, 2020

(65) Prior Publication Data
US 2022/0164697 A1 May 26, 2022

(51) Int. Cl.
G06N 20/00 (2019.01)
G06N 5/02 (2023.01)

(52) U.S. Cl.
CPC .............. *G06N 20/00* (2019.01); *G06N 5/02* (2013.01)

(58) Field of Classification Search
None
See application file for complete search history.

(56) References Cited

U.S. PATENT DOCUMENTS

2020/0076841 A1* 3/2020 Hajimirsadeghi .. G06F 18/2136

OTHER PUBLICATIONS

Miller, Sean, and Curtis Busby-Earle. "The role of machine learning in botnet detection." In 2016 11th international conference for internet technology and secured transactions (icitst), pp. 359-364. IEEE, 2016. (Year: 2016).*

Min, Erxue, Jun Long, Qiang Liu, Jianjing Cui, and Wei Chen. "TR-IDS: Anomaly-based intrusion detection through text-convolutional neural network and random forest." Security and Communication Networks 2018 (2018). (Year: 2018).*

Yang, Chung-Huang, and Kuang-Li Ting. "Fast deployment of botnet detection with traffic monitoring." In 2009 Fifth International Conference on Intelligent Information Hiding and Multimedia Signal Processing, pp. 856-860. IEEE, 2009. (Year: 2009).*

Zhang, Junjie. Effective and scalable botnet detection in network traffic. Georgia Institute of Technology, 2012. (Year: 2012).*

(Continued)

*Primary Examiner* — Vincent Gonzales
(74) *Attorney, Agent, or Firm* — Hartman & Citrin LLC

(57) ABSTRACT

Creating and using learning models to identify botnet traffic can include obtaining netflow data associated with a connecting device that is communicating with a carrier network. The netflow data can represent communications associated with the connecting device. Data features associated with the communications can be extracted. The data features can include statistical information associated with the communications. A learning model based on the data features extracted from the netflow data can be trained. A prediction using the learning model can be generated, and an action based on the prediction can be taken.

20 Claims, 6 Drawing Sheets

(56) References Cited

OTHER PUBLICATIONS

Gaonkar, Shivani, Nandini Fal Dessai, Jenny Costa, Ashlesha Borkar, Shailendra Aswale, and Pratiksha Shetgaonkar. "A survey on botnet detection techniques." In 2020 International Conference on Emerging Trends in Information Technology and Engineering (ic-ETITE), pp. 1-6. IEEE, 2020. (Year: 2020).*

Choi, Byungha, Sung-Kyo Choi, and Kyungsan Cho. "Detection of mobile botnet using VPN." In 2013 Seventh International Conference on Innovative Mobile and Internet Services in Ubiquitous Computing, pp. 142-148. IEEE, 2013. (Year: 2013).*

Kok, Jan, and Bernhard Kurz. "Analysis of the botnet ecosystem." In 10th Conference of Telecommunication, Media and Internet Techno-Economics (CTTE), pp. 1-10. VDE, 2011. (Year: 2011).*

* cited by examiner

CREATING AND USING LEARNING MODELS TO IDENTIFY BOTNET TRAFFIC

BACKGROUND

Modern networks and other carrier networks can be communicated with by millions or even billions of devices at any particular time. From an Internet Protocol ("IP") standpoint, each such communication can include at least two endpoints, a source IP address and a destination IP address. To protect networks and/or devices or users from malicious activity, networks or other threats, carrier networks may examine devices associated with such endpoints to determine if these devices are engaged in malicious activity at any particular time.

In some instances, lists of malicious devices may be publicly available and may be used to try to identify such malicious activity based on IP address or other device-based determinations. These lists may be updated from time to time based on activity witnessed by certain providers.

In some other instances, deep packet inspection may be used on all data transmissions occurring via a carrier network. Deep packet inspection can be expensive in terms of processing power and time, and therefore with the growing number of connecting devices, deep packet inspection and other analysis can be difficult to scale to modern networks.

SUMMARY

The present disclosure is directed to creating and using learning models to identify botnet traffic. The concepts and technologies disclosed herein can use connection-based analysis instead of device-based analysis (e.g., in various embodiments, the connection-based analysis does not make any use of device-based analysis associated with botnet devices such as the botnet devices as illustrated and described herein), which can simplify and reduce the cost of such analysis, thereby enabling in some embodiments speed and scalability. A connecting device can connect to a carrier network. It can be appreciated that when the connecting device connects to the carrier network, it may be unclear whether the connecting device is a legitimate device or a botnet device associated with a botnet. One or more entities associated with the carrier network, for example a monitor and/or a controller, can detect the connection or attempted connection by the connecting device. In response to detecting the connection of the connecting device, the controller or other entity associated with the carrier network can identify the connecting device.

The connecting device can be identified, in some embodiments, based on one or more device identifiers such as a media access control ("MAC") address, an international mobile equipment identity ("MEI"), an international mobile subscriber identity ("IMSI"), or other identifiers; the identity of a user or other entity associated with the connecting device such as an account number, email address, user name, or the like; a network identifier such as a device name, IP address, network ID, other network identifiers, or the like; and/or other identifying information such as authentication information, or the like. The controller or other entity can determine, based on the determined identity associated with the connecting device, if the connected device is included in a device list.

The device list can identify legitimate devices and/or malicious devices, in some embodiments. If the connecting device is included in the device list, the controller or other entity associated with the carrier network can determine if the connecting device should be prevented from connecting to the carrier network and/or subjected to other actions such as deep packet inspection, flow monitoring and/or limitations, combinations thereof, or the like. In some instances, traffic associated with the connecting device can be subjected to deep packet inspection or other processes before placing the connecting device on a device list.

If the controller or other entity associated with the carrier network determines that the connecting device should be prevented from connecting to the carrier network, the controller or other entity associated with the carrier network can trigger performance of the action such as, for example, rejecting the connection of the connecting device, limiting the connection of the connecting device, performing deep packet inspection on traffic associated with the connecting device, combinations thereof, or the like. If the controller or other entity associated with the carrier network determines that the connecting device should not be prevented from connecting to the carrier network, or if the controller or other entity associated with the carrier network determines that the connecting device is not included in the device list, the connection associated with the connecting device can be allowed (and in some embodiments, not subject to any limitations).

The controller or other entity can trigger monitoring of activity associated with the connected device. In some embodiments, the activity can include connections, flows, and/or other types of communications, which can be captured by the monitor or other entities associated with the carrier network. The monitor and/or other entity associated with the carrier network can be configured to trigger delivery of the netflow data to the netflow analysis service.

The netflow analysis service can be configured to obtain the netflow data, and to extract data from the netflow data. For example, the netflow analysis service can extract mobility network data from various domains and/or device types (e.g., Internet-of-things devices, smartphones, tablets, various servers, other devices, etc.), and/or other data from the netflow data. It can be appreciated that the netflow data can be associated with devices connecting to and/or via the carrier network. The netflow analysis service also can be configured to extract data features from the data extracted from the netflow data. These features can capture various netflow characteristics associated with the connecting device and can be used to generate a signature associated with the connecting device. The netflow analysis service also can be configured to capture one or more instances of netflow data and train one or more learning models on the netflow data. Based on the learning models and the signatures, the netflow analysis service can generate one or more predictions associated with the connecting device. For example, the netflow analysis service can determine if the connecting device is a legitimate device (e.g., one of the devices) or a malicious device (e.g., a botnet device such as the botnet device). Similarly, the network analysis service can determine if a server connected to by the connecting device is a legitimate third party server (e.g., a benign server, where "benign" us used to refer to a server that is not part of a botnet), or a command and control server that can be associated with a botnet.

The netflow analysis service can be configured to take an action based on one or more of the predictions. In some embodiments, the action can include adding the connecting device or the server to a device list. In some other embodiments, the action can include disconnecting the connecting device or the server from the carrier network. In some other embodiments, the action can include initiating additional analysis and/or operations on flows associated with the connecting device such as, for example, deep packet inspection, limiting communications by the connecting device, combinations thereof, or the like. Because additional and/or alternative actions can be taken based on the predictions, it should be understood that these examples are illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining netflow data associated with a connecting device that is communicating with a resource of a carrier network. The netflow data can represent communications associated with the connecting device. The operations further can include extracting, from the netflow data, data features associated with the communications. The data features can include statistical information associated with the communications. The operations further can include training a learning model based on the data features extracted from the netflow data, generating a prediction using the learning model, and taking an action based on the prediction.

In some embodiments, the data features associated with the communications can be extracted from a data set that can be extracted from the netflow data. The data set that can be extracted from the netflow data can include command and control data associated with the connecting device. In some embodiments, the learning model can include a machine learning model. The machine learning model can include a random forest learning model. In some embodiments, the learning model can include a deep learning model. The deep learning model can include a weighted convolutional neural network.

In some embodiments, taking the action can include adding the connecting device to a device list and triggering delivery of the device list to a controller associated with the carrier network. In some embodiments, generating the prediction further can include filtering the learning model based on the data features extracted from the netflow data; and determining, based on the filtering, that the communications are associated with a botnet device.

According to another aspect of the concepts and technologies disclosed herein, a method is disclosed. The method can include obtaining, by a computing device comprising a processor, netflow data associated with a connecting device that is communicating with a resource of a carrier network. The netflow data can represent communications associated with the connecting device. The method further can include extracting, by the processor and from the netflow data, data features associated with the communications. The data features can include statistical information associated with the communications. The method further can include training, by the processor, a learning model based on the data features extracted from the netflow data, generating, by the processor, a prediction using the learning model, and taking, by the processor, an action based on the prediction.

In some embodiments, the data features associated with the communications can be extracted from a data set that can be extracted from the netflow data. The data set that can be extracted from the netflow data can include command and control data associated with the connecting device. In some embodiments, the learning model can include a machine learning model that can include a random forest learning model. In some embodiments, the learning model can include a deep learning model that can include a weighted convolutional neural network.

In some embodiments, taking the action can include adding the connecting device to a device list and triggering delivery of the device list to a controller associated with the carrier network. In some embodiments, the netflow data can be obtained from a monitor of the carrier network. The monitor can be configured to monitor the communications associated with the connecting device. The monitor can be invoked by a controller of the carrier network.

In some embodiments, the controller can be configured to detect the communications associated with the connecting device; to identify the connecting device; to determine if the connecting device is on a device list; and in response to determining that the connecting device is on the device list, to determine if a connection by the connecting device to the carrier network should be rejected. In some embodiments, the controller can be configured to detect the communications associated with the connecting device; to identify the connecting device; to determine if the connecting device is on a device list; and in response to determining that the connecting device is on the device list, to initiate deep packet inspection of a packet flow associated with the connecting device.

According to yet another aspect of the concepts and technologies disclosed herein, a computer storage medium is disclosed. The computer storage medium can store computer-executable instructions that, when executed by a processor, cause the processor to perform operations. The operations can include obtaining netflow data associated with a connecting device that is communicating with a resource of a carrier network. The netflow data can represent communications associated with the connecting device. The operations further can include extracting, from the netflow data, data features associated with the communications. The data features can include statistical information associated with the communications. The operations further can include training a learning model based on the data features extracted from the netflow data, generating a prediction using the learning model, and taking an action based on the prediction.

In some embodiments, the data features associated with the communications can be extracted from a data set that can be extracted from the netflow data. The data set that can be extracted from the netflow data can include command and control data associated with the connecting device. In some embodiments, the learning model can include a machine learning model. The machine learning model can include a random forest learning model. In some embodiments, the learning model can include a deep learning model. The deep learning model can include a weighted convolutional neural network.

In some embodiments, taking the action can include adding the connecting device to a device list and triggering delivery of the device list to a controller associated with the carrier network. In some embodiments, generating the prediction further can include filtering the learning model based on the data features extracted from the netflow data; and determining, based on the filtering, that the communications are associated with a botnet device.

Other systems, methods, and/or computer program products according to embodiments will be or become apparent to one with skill in the art upon review of the following drawings and detailed description. It is intended that all such

DETAILED DESCRIPTION

Figure 1:
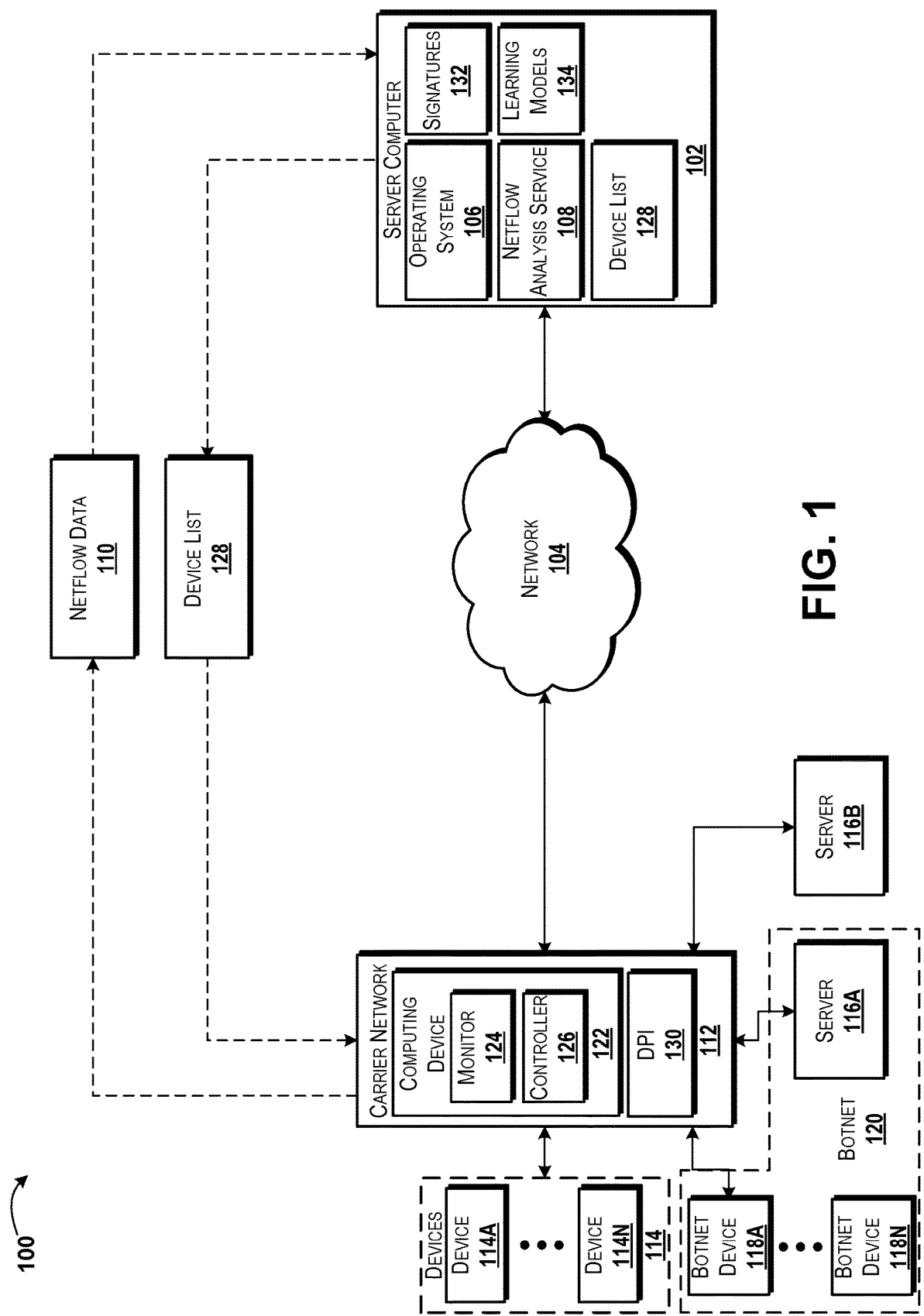
FIG. 1 is a system diagram illustrating an illustrative operating environment for various embodiments of the concepts and technologies described herein.

The following detailed description is directed to creating and using learning models to identify botnet traffic. The concepts and technologies disclosed herein can use connection-based analysis instead of device-based analysis (e.g., in various embodiments, the connection-based analysis does not make any use of device-based analysis associated with botnet devices such as the botnet devices as illustrated and described herein), which can simplify and reduce the cost of such analysis, thereby enabling in some embodiments speed and scalability. A connecting device can connect to a carrier network. It can be appreciated that when the connecting device connects to the carrier network, it may be unclear whether the connecting device is a legitimate device or a botnet device associated with a botnet. One or more entities associated with the carrier network, for example a monitor and/or a controller, can detect the connection or attempted connection by the connecting device. In response to detecting the connection of the connecting device, the controller or other entity associated with the carrier network can identify the connecting device.

The connecting device can be identified, in some embodiments, based on one or more device identifiers such as a MAC address, an IMEI, an IMSI, or other identifiers; the identity of a user or other entity associated with the connecting device such as an account number, email address, user name, or the like; a network identifier such as a device name, IP address, network ID, other network identifiers, or the like; and/or other identifying information such as authentication information, or the like. The controller or other entity can determine, based on the determined identity associated with the connecting device, if the connected device is included in a device list.

The device list can identify legitimate devices and/or malicious devices, in some embodiments. If the connecting device is included in the device list, the controller or other entity associated with the carrier network can determine if the connecting device should be prevented from connecting to the carrier network and/or subjected to other actions such as deep packet inspection, flow monitoring and/or limitations, combinations thereof, or the like. In some instances, traffic associated with the connecting device can be subjected to deep packet inspection or other processes before placing the connecting device on a device list.

If the controller or other entity associated with the carrier network determines that the connecting device should be prevented from connecting to the carrier network, the controller or other entity associated with the carrier network can trigger performance of the action such as, for example, rejecting the connection of the connecting device, limiting the connection of the connecting device, performing deep packet inspection on traffic associated with the connecting device, combinations thereof, or the like. If the controller or other entity associated with the carrier network determines that the connecting device should not be prevented from connecting to the carrier network, or if the controller or other entity associated with the carrier network determines that the connecting device is not included in the device list, the connection associated with the connecting device can be allowed (and in some embodiments, not subject to any limitations).

The controller or other entity can trigger monitoring of activity associated with the connected device. In some embodiments, the activity can include connections, flows, and/or other types of communications, which can be captured by the monitor or other entities associated with the carrier network. The monitor and/or other entity associated with the carrier network can be configured to trigger delivery of the netflow data to the netflow analysis service.

The netflow analysis service can be configured to obtain the netflow data, and to extract data from the netflow data. For example, the netflow analysis service can extract mobility network data from various domains and/or device types (e.g., Internet-of-things devices, smartphones, tablets, servers, etc.) and/or other data from the netflow data. The netflow analysis service also can be configured to extract data features from the data extracted from the netflow data. These features can capture various netflow characteristics associated with the connecting device and can be used to generate a signature associated with the connecting device. The netflow analysis service also can be configured to capture one or more instances of netflow data and train one or more learning models on the netflow data. Based on the learning models and the signatures, the netflow analysis service can generate one or more predictions associated with the connecting device. For example, the netflow analysis service can determine if the connecting device is a legitimate device (e.g., one of the devices) or a malicious device (e.g., a botnet device such as the botnet device). Similarly, the network analysis service can determine if a server connected to by the connecting device is a legitimate third party server (e.g., a benign server), or a command and control server associated with a botnet.

The netflow analysis service can be configured to take an action based on one or more of the predictions. In some embodiments, the action can include adding the connecting device or the server to a device list. In some other embodiments, the action can include disconnecting the connecting device or the server from the carrier network. In some other embodiments, the action can include initiating additional analysis and/or operations on flows associated with the connecting device such as, for example, performing deep packet inspection, limiting communications by the connecting device, combinations thereof, or the like. Because additional and/or alternative actions can be taken based on the predictions, it should be understood that these examples are illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating and using learning models to identify botnet traffic will be described, according to an illustrative embodiment. The operating environment 100 shown in FIG. 1 includes a server computer 102. The server computer 102 can operate in communication with and/or as part of a communications network ("network") 104, though this is not necessarily the case.

According to various embodiments, the functionality of the server computer 102 may be provided by one or more server computers, desktop computers, laptop computers, set-top boxes, other computing systems, and the like. It should be understood that the functionality of the server computer 102 can be provided by a single device, by two or more similar devices, and/or by two or more dissimilar devices. For purposes of describing the concepts and technologies disclosed herein, the server computer 102 is described herein as a server computer such as an application server, or the like. It should be understood that this embodiment is illustrative, and should not be construed as being limiting in any way.

The server computer 102 can execute an operating system 106 and one or more application programs such as, for example, a netflow analysis service 108. The operating system 106 can include a computer program for controlling the operation of the server computer 102. The netflow analysis service 108 can include an executable program that can be configured to execute on top of the operating system 106 to provide various functions as illustrated and described herein.

The netflow analysis service 108 can be configured to obtain and analyze netflow data 110. In particular, as shown in FIG. 1, the netflow analysis service 108 can be configured to obtain the netflow data 110 from a carrier network 112. According to various embodiments of the concepts and technologies disclosed herein, the carrier network 112 can correspond to a collection of one or more entities, devices, or other computing resources. According to various embodiments of the concepts and technologies disclosed herein, the resources can correspond to and/or can include one or more servers, one or more applications, one or more software modules, and/or other computing resources associated with the carrier network 112. It should be understood that in some embodiments, the server computer 102 can operate on the carrier network 112, and that in some other embodiments, the carrier network 112 and the server computer 102 can operate on the network 104. As such, the illustrated embodiment is illustrative and should not be construed as being limiting in any way.

As shown in FIG. 1, the carrier network 112 can communicate with and/or can be accessed by one or more devices 114A-N (hereinafter collectively and/or generically referred to as "devices 114"). These devices can include one or more computers, mobile telephones, tablet computing devices, and/or other entities such as applications, modules, appliances, and the like. Thus, the devices 114 can include any number of legitimate devices that are connecting to the carrier network 112 for various purposes (e.g., to run applications, to access web pages, to access portals, etc.).

According to various embodiments, the carrier network 112 can enable access (e.g., to the one or more devices 114) to one or more servers 116A-B (hereinafter collectively and/or generically referred to as "servers 116"). The servers 116 can include benign servers (e.g., application servers, websites, etc.) that can be accessed via the carrier network 112. According to some embodiments, however, one of the servers 116 (e.g., the server 116A in FIG. 1) can serve as a command and control server, as will be explained in more detail below.

According to various embodiments of the concepts and technologies disclosed herein, the carrier network 112 also can be communicated with and/or accessed by one or more botnet devices 118A-N (hereinafter collectively and/or generically referred to as "botnet devices 118"). As used herein, a "botnet device" can be used to refer to a device that is part of a bot network (hereinafter referred to as a "botnet") 120. As is known, the botnet 120 can include one or more command and control server that can coordinate an attack by one or more botnet devices 118. In the illustrated embodiment, the functionality of the command and control server can be provided by the server 116A. It should be understood that this example is illustrative, and therefore should not be construed as being limiting in any way.

Thus, it can be appreciated that a botnet 120 can include a collection and/or a network of devices (of which the botnet device 118A can be one). The devices of the botnet 120, including the botnet device 118A, can be controlled via malicious software and/or by the server 116A to perform various actions. In some cases, for example, the devices of the botnet 120, including one or more of the botnet devices 118, can connect to and/or communicate with the carrier network 112 to propagate viruses or other malware, to send spam messages, to execute phishing attacks or other attacks, to create requests (e.g., as part of a denial of service ("DoS") attack), and/or to perform other malicious actions.

According to various embodiments of the concepts and technologies disclosed herein, the carrier network 112 also can include one or more computing devices 122. The functionality of the one or more computing devices 122 can be provided, in various embodiments, by one or more server computers, desktop computers, laptop computers, other computing systems, and the like. For purposes of describing the concepts and technologies disclosed herein, the computing device 122 is described herein as a server computer such as an application server, or the like. It should be understood that this embodiment is illustrative, and should not be construed as being limiting in any way.

The computing device 122 can be configured to host and/or execute one or more modules, services, applications, or the like such as, for example, a monitor 124 and a controller 126. The monitor 124 can be configured to perform monitoring of traffic to, within, and/or via the carrier network 112. Thus, the functionality of the monitor 124 can correspond, in some embodiments, to a network monitor, or the like. Although the monitor 124 and the controller 126 are illustrated as components or modules hosted by a computing device 122, it should be understood that each of these components, or combinations thereof, may be embodied as or in stand-alone devices or components thereof operating as part of or in communication with the carrier network 112. As such, the illustrated embodiment should be understood as being illustrative of only some contemplated embodiments and should not be construed as being limiting in any way.

The monitor 124 can be configured to collect information about each connection and/or request generated within and/or in association with the carrier network 112 and/or resources thereof. The monitor 124 can be configured to generate the netflow data 110 based on the monitored communications and/or connections. In some embodiments, the computing device 122 also can be configured to provide the netflow data 110 to the server computer 102 and/or to trigger other devices within and/or associated with the carrier network 112 to provide the netflow data 110 to the server computer 102. According to various embodiments of the concepts and technologies disclosed herein, the netflow data 110 can include, but is not limited to, mobility network data from various domains and/or device types (e.g., one or more Internet-of-things devices, one or more smartphones, one or more tablet devices, and/or or one or more other devices 114; one or more web servers, one or more application servers, and/or one or more other types of servers 116; one or more botnet devices 118; one or more other devices; etc.), other data, combinations thereof, or the like. Because other types of information and/or data can be included in the netflow data 110, it should be understood that these examples are illustrative, and therefore should not be construed as being limiting in any way.

The controller 126 can be configured to manage connections to and/or with the carrier network 112. Thus, the controller 126 can be configured to identify entities (e.g., the devices 114, the servers 116, the botnet device 118, etc.) that connect to the carrier network 112, that are connected to via the carrier network 112, and/or from or to which connections are attempted via the carrier network 112; to determine if the connection or attempted connection should be allowed or blocked; to take various actions based on the determination, and the like. Thus, in some embodiments of the concepts and technologies disclosed herein, the controller 126 can be configured to allow or block connections from devices based on various information that can be accessible by and/or available to the controller 126. In some embodiments of the concepts and technologies disclosed herein, for example, the controller 126 can be configured to access a device list 128.

The device list 128 can include a list of allowed devices (e.g., devices that are allowed to connect to the carrier network 112); a list of blocked devices (e.g., devices that are blocked from connecting to the carrier network 112 and/or connecting to servers 116 via the carrier network 112); servers 116 that are prohibited from communicating via the carrier network 112; combinations thereof; or the like. The creation of the device list 128 will be addressed in more detail below with reference to the functionality of the netflow analysis service 108. Because the controller 126 can perform access control functions in additional and/or alternative manners in some embodiments of the concepts and technologies disclosed herein, for example through authentication, etc., it should be understood that the embodiment shown in FIG. 1 is illustrative, and therefore should not be construed as being limiting in any way.

In some embodiments of the concepts and technologies disclosed herein, the controller 126 can be configured to detect a connection to a server 116 by a connecting device that could be a device 114 or a botnet device 118. This detected connection can occur via the carrier network 112, and the controller 126 can be configured to identify the connecting device. In some embodiments, the connecting device can be identified by its IP address, by a device identifier (e.g., a MAC address, IMEI, or other identifier), by a user or other entity or account associated therewith (e.g., by authenticating with the carrier network 112), combinations thereof, or the like. The controller 126 can determine if the connecting device is on a device list 128. It can be appreciated that in various embodiments of the concepts and technologies disclosed herein, a connecting device may not be on a device list 128. For example, the connecting device may not have connected to the carrier network 112 before, and therefore may not be included on a device list. Thus, the controller 126 may determine if the connection should be rejected or allowed based on the device list 128, in some embodiments, or may allow connecting devices that are not included in the device list 128, in some embodiments.

If the connecting device is determined by the controller 126 to be included on a device list 128 as a device for which connections should be rejected (e.g., the server 116A, which can function as a command and control server for the botnet 120 and/or one or more botnet devices 118), the controller 126 can reject the connection associated with the connecting device. If the connecting device is determined by the controller 126 to not be included on a device list 128 as a device for which connections should be rejected, the controller 126 can allow the connection associated with the connecting device, though such connecting devices may be subjected to additional analysis as will be explained in more detail herein. Of course, some embodiments of the device list 128 can indicate connecting devices that should be allowed to connect instead of indicating devices that should not be allowed to connect. As such, the above examples are illustrative and should not be construed as being limiting in any way.

If the connection is allowed by the controller 126, the monitor 124 can be invoked, in some instances, to monitor traffic associated with the connecting device. In some other instances, additional operations may be performed on the traffic associated with the connecting device. For example, the monitor 124 or controller 126 can be configured to activate a deep packet inspection module or device ("deep packet inspection") 130. The deep packet inspection 130 can analyze the traffic associated with the connecting device to determine if the connecting device should be allowed to remain connected to the carrier network 112 or disconnected from the carrier network 112. Thus, it can be appreciated that instead of performing deep packet inspection operations on all traffic associated with the carrier network 112, that embodiments of the concepts and technologies disclosed herein can instead perform deep packet inspection operations only on traffic that has not yet been verified as safe or unsafe. Thus, embodiments of the concepts and technologies disclosed herein can provide for performing deep pocket inspection on communications that are identified based on a learning model and/or machine learning. It should be understood that this example is illustrative, and therefore should not be construed as being limiting in any way.

According to various embodiments, the monitor 124 also can be configured to monitor connections and/or communications associated with the connecting device, and to generate the netflow data 110 based on these communications and/or connections. The monitor 124 can be configured to trigger delivery of the netflow data 110 to the netflow analysis service 108 as noted above. It should be understood that this example is illustrative, and therefore should not be construed as being limiting in any way.

According to various embodiments of the concepts and technologies disclosed herein, the netflow analysis service 108 can obtain the netflow data 110 from the carrier network 112. As noted above, the netflow data 110 can be provided to the netflow analysis service 108 by the monitor 124, in some embodiments, or by other devices or resources associated with the carrier network 112. According to various embodiments of the concepts and technologies disclosed herein, the carrier network 112 (and/or entities associated with the carrier network 112 such as the monitor 124) can send the netflow data 110 to the netflow analysis service 108 at various times such as, for example, at time intervals, on demand (e.g., in response to one or more requests for the netflow data 110), and/or at other times or events. The netflow analysis service 108 can be configured to obtain the netflow data 110 and to perform various operations on the netflow data 110.

In some embodiments, for example, the monitor 124 and/or other devices or entities can be configured to provide the netflow data 110 to the netflow analysis service 108 when a new connection is detected. For example, if a connecting device is not included on a device list 128, the monitor 124 can be configured to monitor traffic (e.g., connections and/or communications associated with the connecting device) and trigger delivery of netflow data 110 associated with these connections to the netflow analysis service 108. Thus, the netflow data 110 can be received when a new connecting device is detected, for example, though this is not necessarily the case.

The netflow analysis service 108 can be configured to analyze the netflow data 110 associated with a connecting device and to generate one or more signatures 132 associated with the connecting device. The signatures 132 can represent the connections and/or communications associated with the connecting device. In some embodiments, the netflow analysis service 108 also can be configured to train one or more learning models 134 based on any number of instances of netflow data 110, which in some embodiments can be collected over time. The learning models 134 can be created using machine learning, deep learning, and/or other types of artificial intelligence, and can represent communications and/or connections associated with various devices.

In some embodiments, for example, a machine learning model can be included in the learning models 134. The machine learning model 134 can represent netflow activity associated with one or more devices (e.g., one or more Internet-of-things devices, one or more smartphones, one or more tablet devices, or other devices 114; one or more web servers, one or more application servers, and/or one or more other types of servers 116; one or more botnet devices 118; other devices; etc.). In some other embodiments, for example, a deep learning model can be included in the learning models 134. The deep learning model can represent netflow activity associated with one or more of the various devices that can connect to and/or via the carrier network 112. It should be understood that these examples are illustrative, and therefore should not be construed as being limiting in any way.

According to various embodiments of the concepts and technologies disclosed herein, the signature 132 can be input into the learning models 134, and a result can indicate if the connecting device (that is connecting for the first time) corresponds to a legitimate connecting device or a malicious connecting device such as one of the botnet devices 118 and/or the server 116A (e.g., a command and control server). The netflow analysis service 108 can be configured to store the signatures 132 and the learning models 134 at the server computer 102 and/or elsewhere. In particular, although not illustrated in FIG. 1, it should be understood that the signatures 132 and/or the learning models 134 can be stored in other data storage locations such as, for example, a data store. The functionality of the data store can be provided by one or more databases, server computers, desktop computers, mobile telephones, laptop computers, other computing systems, and the like.

Thus, it can be appreciated that in some embodiments, the netflow analysis service 108 can create and/or access one or more machine learning and/or deep learning models 134 to provide the learning models 134 illustrated and described herein. In particular, as is known, neural networks such as the learning models 134 shown in FIG. 1 can include one or more algorithms that can provide deep learning, machine learning, and/or other forms of artificial intelligence. According to various embodiments of the concepts and technologies disclosed herein, the learning models 134 can be trained to model the connecting devices (e.g., the devices 114 and/or botnet devices 118 and/or command and control servers such as the server 116A that may be connecting to the carrier network 112) to represent behavior associated with those connecting devices based on various data and/or data features that can be extracted from one or more instances of the netflow data 110.

Specifically, as noted above, the netflow data 110 can include, for example mobility network data from various domains and/or device types (e.g., one or more Internet-of-things devices, one or more smartphones, one or more tablet devices, or other devices 114; one or more web servers, one or more application servers, and/or one or more other types of servers 116; one or more botnet devices 118; other devices; etc.). According to various embodiments of the concepts and technologies disclosed herein, the mobility network data can be extracted from the netflow data 110. The netflow analysis service 108 can be configured to generate one or more of the learning models 134 based on mobility network data included in the netflow data 110. In particular, machine learning features can be extracted from the extracted mobility network data from the netflow data 110, and a machine learning model such as, for example, a random forest machine learning model can be generated based on the extracted features from the mobility network data, thereby creating one of the learning models 134. It should be understood that this example is illustrative, and therefore should not be construed as being limiting in any way.

According to some other embodiments of the concepts and technologies disclosed herein, one or more of the learning models 134 can be generated based on mobility network data from various domains and/or device types (e.g., one or more Internet-of-things devices, one or more smartphones, one or more tablet devices, or other devices 114; one or more web servers, one or more application servers, and/or one or more other types of servers 116; one or more botnet devices 118; other devices; etc.) and/or other data included in the netflow data 110. Deep learning features can be extracted from the extracted mobility network data from the netflow data 110, and a deep learning model such as, for example, a weighted convolutional neural network can be generated based on the extracted features from the mobility network data, thereby creating another one of the learning models 134. As such it can be appreciated that the learning models 134 can include a machine learning model and a deep learning model, in some embodiments. Because additional and/or alternative models can be included in the learning models 134, it should be understood that these examples are illustrative, and therefore should not be construed as being limiting in any way.

The extracted data can be analyzed by the netflow analysis service 108, and the netflow analysis service 108 can extract one or more features from the extracted data. In some embodiments, for example, the netflow analysis service 108 can extract machine learning features and deep learning features from the mobility network data. It should be understood that these examples are illustrative, and therefore should not be construed as being limiting in any way.

According to various embodiments of the concepts and technologies disclosed herein, the extracted features can include various signatures 132 that can be computed for source IP address and/or destination IP address. According to various embodiments of the concepts and technologies disclosed herein, these extracted features can include, but are not limited to, various flow size features associated with a data transmission. Example flow size features can include, but are not limited to, a) a total number of bytes transmitted, b) a total number of packets transmitted, c) an average bytes per packet ratio for data transmitted, d) an average length of data transmitted, e) a number of dominant ratios in data transmitted, f) an average packet rate for data transmitted, g) an average byte rate for data transmitted, h) an average number of packets per second in data transmitted, i) an average number of bytes per second in data transmitted, j) a standard deviation of bytes to packets ratios in data transmitted, and/or k) a dominant flow count in data transmitted. Because other flow size features can be extracted from the netflow data 110, it should be understood that these examples are illustrative, and therefore should not be construed as being limiting in any way.

According to various embodiments of the concepts and technologies disclosed herein, the extracted features also can include, but are not limited to, various flow features associated with a data transmission. Example flow features can include, but are not limited to, a) a total duration of a data transmission, b) a maximum duration of a data transmission, c) source ports associated with a data transmission, d) a destination port associated with a data transmission, e) a number of flows associated with a data transmission, f) an indication of whether a destination or a host initiated the connection used for the data transmission, and/or g) a unique number of destination IP addresses associated with the data transmission. Because other flow features can be extracted from the netflow data 110, it should be understood that these examples are illustrative, and therefore should not be construed as being limiting in any way.

According to various embodiments of the concepts and technologies disclosed herein, the extracted features also can include, but are not limited to, various beacon features associated with a data transmission. Example beacon features can include, but are not limited to, a) a periodicity for inter-arrival times (start times of successive flows) associated with a data transmission, b) average inter-arrival times of flows associated with a data transmission, c) a standard deviation of inter-arrival times (e.g., where a low standard deviation can imply a periodic data transmissions), and/or d) a standard deviation of packet counts (e.g., where a trim can be, for example, 0.025). Because other beacon features can be extracted from the netflow data 110, it should be understood that these examples are illustrative, and therefore should not be construed as being limiting in any way.

In some embodiments, the learning models 134 can be used to predict output based on input. In particular, a signature 132 or other data associated with activity of the connecting device (e.g., a connection associated with the connecting device) can be analyzed and the learning models 134 can be filtered based on the features in the signature 132 to determine if a connecting device is a legitimate device such as the devices 114 and/or a benign third party server such as the server 116B; and/or if the connecting device is a malicious device such as one of the botnet devices 118 and/or a command and control server such as the server 116A. As such, the signatures 132 and the learning models 134 can be used, in some embodiments, to determine if a new connecting device (that is connecting for the first time to a carrier network 112) is a legitimate device such as the devices 114 and/or a benign third party server such as the server 116B; and/or if the connecting device is a malicious device such as one of the botnet devices 118 and/or a command and control server such as the server 116A. In some other embodiments, the learning models 134 can be filtered to identify legitimate and/or malicious devices based on various filtered data points, and devices can be added to device lists 128 as appropriate.

In particular, the netflow analysis service 108 can be configured to add an entry to a device list 128 to represent the determination. In some embodiments, for example, the netflow analysis service 108 can add an entry to the device list 128 that indicates that the connecting device is a legitimate device such as one of the devices 114 and/or a benign third party server such as the server 116B, with an identity of the connecting device. Thus, in such cases, future connections associated with the connecting device can be approved by the controller 126. In some other embodiments, for example, the netflow analysis service 108 can add an entry to the device list 128 that indicates that the connecting device is a malicious device such as one of the botnet devices 118 and/or a command and control server such as the server 116A, with an identity of the connecting device. Thus, in such cases, future connections associated with the connecting device can be blocked by the controller 126. Thus, it can be appreciated that the device list 128 can correspond to an allowed list, a blocked list, and/or a combination thereof.

The netflow analysis service 108 can be configured to provide the device list 128 to the carrier network 112, for example to the controller 126 for use in managing future connections by the connecting device. Thus, it can be appreciated that the netflow data 110 associated with a connecting device can be captured, reported, and analyzed to generate a statistical signature ("signature") 132 associated with the connecting device. The signature 132 can be used as input for one of the learning models 134, which can be generated based on netflow data 110 analyzed over time. Output from the learning models 134 can indicate whether the connecting device is a legitimate device such as the devices 114 and/or a benign third party server such as the server 116B; and/or if the connecting device is a malicious device such as one of the botnet devices 118 and/or a command and control server such as the server 116A. These and other aspects of the concepts and technologies disclosed herein will be further described below.

In practice, a connecting device can connect to a carrier network 112. It can be appreciated that when the connecting device connects to the carrier network 112 or attempts to connect to the carrier network 112, it may be unclear whether the connecting device is a legitimate device such as the devices 114 and/or a benign third party server such as the server 116B; and/or if the connecting device is a malicious device such as one of the botnet devices 118 and/or a command and control server such as the server 116A. One or more entities associated with the carrier network 112, for example the monitor 124 and/or the controller 126, can detect the connection or attempted connection by the connecting device.

In response to detecting the connection of the connecting device, the controller 126 or other entity associated with the carrier network 112 can identify the connecting device. The connecting device can be identified, in some embodiments, based on one or more device identifiers such as a MAC address, an IMEI, an IMSI, or other identifiers; the identity of a user or other entity associated with the connecting device such as an account number, email address, user name, or the like; a network identifier such as a device name, IP address, network ID, other network identifiers, or the like; and/or other identifying information such as authentication information, or the like. The controller 126 or other entity can determine, based on the determined identity associated with the connecting device, if the connected device is included in a device list 128. The device list 128 can identify legitimate devices and/or malicious devices, in some embodiments.

If the connecting device is included in the device list 128, the controller 126 or other entity associated with the carrier network 112 can determine if the connecting device should be prevented from connecting to the carrier network 112 and/or subjected to other actions such as deep packet inspection by the deep packet inspection 130, flow monitoring and/or limitations, combinations thereof, or the like. If the controller 126 or other entity associated with the carrier network 112 determines that the connecting device should be prevented from connecting to the carrier network 112, the controller 126 or other entity associated with the carrier network 112 can trigger performance of the action such as, for example, rejecting the connection of the connecting device, performing the connection to deep packet inspection 130, limiting the connection of the connecting device, or the like. If the controller 126 or other entity associated with the carrier network 112 determines that the connecting device should not be prevented from connecting to the carrier network 112, or if the controller 126 or other entity associated with the carrier network determines that the connecting device is not included in the device list 128, the connection associated with the connecting device can be allowed (and in some embodiments, not subject to any limitations).

The controller 126 or other entity can trigger monitoring of activity by the connected device. In some embodiments, the activity can include connections, flows, and/or other types of communications, which can be captured by the monitor 124 or other entities associated with the carrier network 112. The monitor 124 and/or other entity associated with the carrier network 112 can be configured to trigger delivery of the netflow data 110 to the netflow analysis service 108.

The netflow analysis service 108 can be configured to obtain the netflow data 110, and to extract data from the netflow data 110. For example, the netflow analysis service 108 can extract mobility network data from various domains and/or device types (e.g., one or more Internet-of-things devices, one or more smartphones, one or more tablet devices, and/or or one or more other devices 114; one or more web servers, one or more application servers, and/or one or more other types of servers 116; one or more botnet devices 118; one or more other devices; etc.), and/or other data from the netflow data 110. The netflow analysis service 108 also can be configured to extract data features from the data extracted from the netflow data 110. These features can capture various netflow characteristics associated with the connecting device and can be used to generate a signature 132 associated with the connecting device. The netflow analysis service 108 also can be configured to capture one or more instances of netflow data 110 and train one or more learning models 134 on the netflow data 110. Based on the learning models 134 and the signatures 132, the netflow analysis service 108 can generate one or more predictions associated with the connecting device. For example, the netflow analysis service can determine if the connecting device is a legitimate device (e.g., one of the devices 114) or a malicious device (e.g., a botnet device such as the botnet device 118).

The netflow analysis service 108 can be configured to take an action based on one or more of the predictions. In some embodiments, the action can include adding the connecting device to a device list 128. In some other embodiments, the action can include disconnecting the connecting device. In some other embodiments, the action can include initiating additional analysis and/or operations on flows associated with the connecting device such as, for example, performing deep packet inspection, limiting communications by the connecting device, combinations thereof, or the like. Because additional and/or alternative actions can be taken based on the predictions, it should be understood that these examples are illustrative, and therefore should not be construed as being limiting in any way.

It can be appreciated that embodiments of the concepts and technologies disclosed herein can allow the carrier network 112 to access a device list 128 that has been generated by the netflow analysis service 108, and thereby avoid relying on publicly available data sets or data collected using honeypots, firewalls, or the like. Instead of relying on these sorts of data sets, which tend to be obsolete and/or outdated quickly (malicious devices quickly change behavior once on such lists and/or connect via other entry points or identities to avoid detection), the embodiments of the concepts and technologies disclosed herein generate custom device lists 128 that can be updated each time a new instance of netflow data 110 is analyzed by the netflow analysis service 108. It should be understood that this example is illustrative, and therefore should not be construed as being limiting in any way.

Because embodiments of the concepts and technologies disclosed herein can avoid the use of deep packet inspection on all flows and/or data transmissions, the concepts and technologies disclosed herein can be scalable, and therefore can accommodate massive volume of traffic by limiting deep packet inspection and/or other costly operations (e.g., monitoring flows, packets, etc.) to flows associated with connecting devices on the device list 128. It should be understood that this example is illustrative, and therefore should not be construed as being limiting in any way.

Because the signatures 132 can be generated using deep learning, machine learning, and/or other statistical operations, new signatures 132 can be continually created to characterize devices as botnet devices 118 and/or command and control ("C2") traffic associated with a botnet 120 and/or a command and control server such as the server 116A. Thus, embodiments of the concepts and technologies disclosed herein can enable continual updating of the signatures 132 and the learning models 134, and thereby provide continually updated protection for the carrier network 112.

It should be understood that this example is illustrative, and therefore should not be construed as being limiting in any way.

As used herein and in the claims, the phrase "connecting device" refers to any of the devices 114, the servers 116, and/or the botnet devices 118, and/or other devices that may connect to the carrier network 112. It therefore can be appreciated that the analysis illustrated and described herein can be used to determine whether the connecting device is a legitimate device and/or a malicious device. It should be understood that this example is illustrative, and therefore should not be construed as being limiting in any way.

FIG. 1 illustrates one server computer 102, one network 104, one carrier network 112, one monitor 124, one controller 126, and one deep packet inspection 130. It should be understood, however, that various implementations of the operating environment 100 can include one or more than one server computer 102; one or more than one network 104; one or more than one carrier network 112; zero, one, or more than one monitor 124; zero, one, or more than one controller 126; and/or zero, one, or more than one deep packet inspection 130. As such, the illustrated embodiment should be understood as being illustrative, and should not be construed as being limiting in any way.

Figure 2:
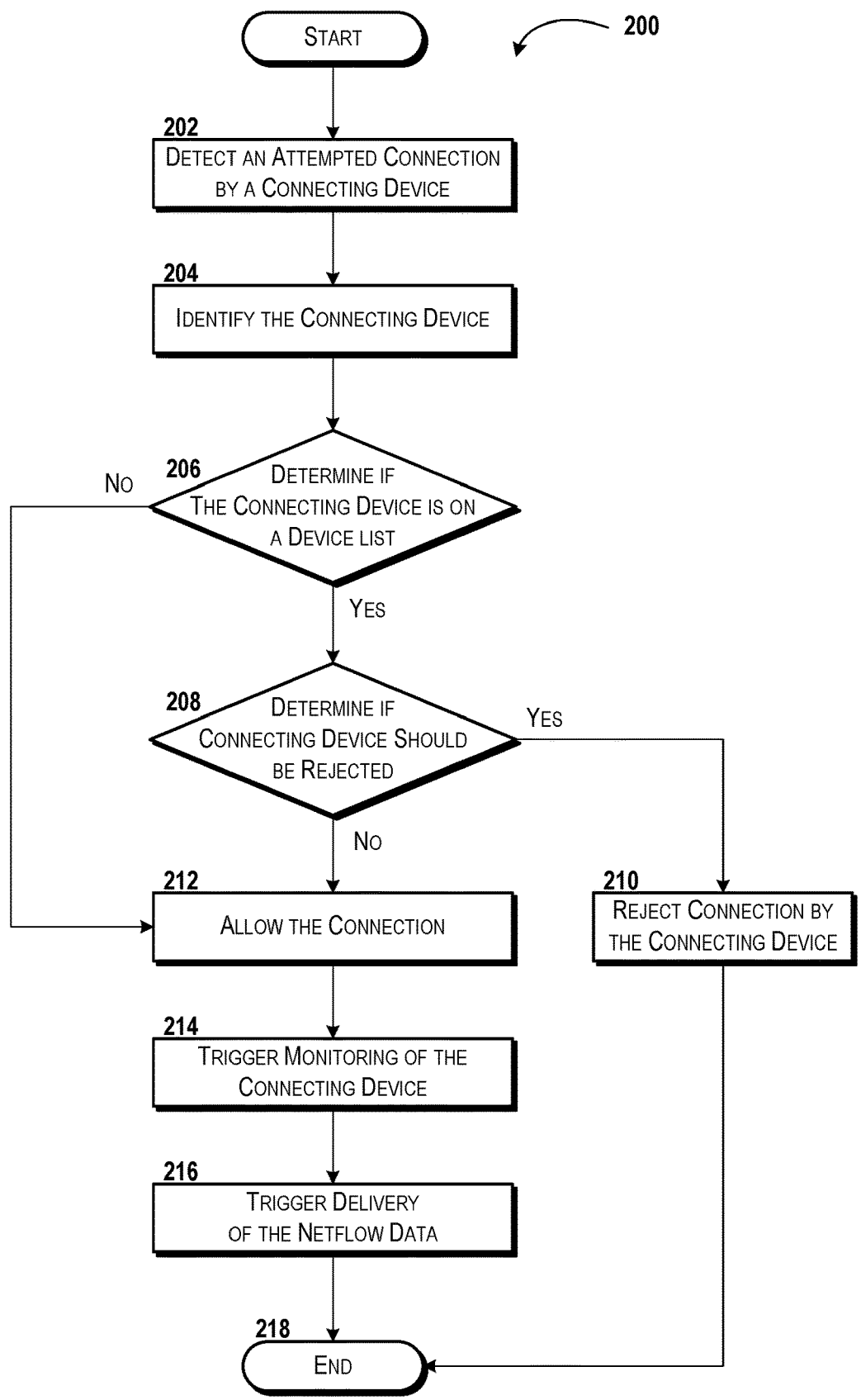
FIG. 2 is a flow diagram showing aspects of a method for managing traffic using learning models, according to an illustrative embodiment of the concepts and technologies described herein.

Turning now to FIG. 2, aspects of a method 200 for managing traffic using learning models will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, the computing device 122, and/or other devices associated with the carrier network, to perform one or more operations and/or causing the processor to direct other components of the computing system or device to perform one or more of the operations.

For purposes of illustrating and describing the concepts of the present disclosure, the method 200 is described herein as being performed by the computing device 122 via execution of one or more software modules such as, for example, the controller 126. It should be understood that additional and/or alternative devices and/or network nodes can provide the functionality described herein via execution of one or more modules, applications, and/or other software including, but not limited to, the controller 126. Thus, the illustrated embodiments are illustrative, and should not be viewed as being limiting in any way.

The method 200 begins at operation 202. At operation 202, the computing device 122 can detect an attempted connection by a connecting device. In some embodiments, the device attempting to connect in operation 202 can correspond to a benign or legitimate device (e.g., the device 114A or the server 116B shown in FIG. 1). In some embodiments, the device attempting to connect in operation 202 can correspond to a malicious or illegitimate device (e.g., one of the botnet devices 118 or a command and control server such as the server 116A). Thus, operation 202 can correspond to the monitor 124, controller 126, and/or other entity of the carrier network 112 detecting an attempted connection by a connecting device.

From operation 202, the method 200 can proceed to operation 204. At operation 204, the computing device 122 can identify the connecting device. Thus, operation 204 can correspond to the computing device 122 identifying the connecting device that connected to the carrier network 112 in operation 202. In some embodiments, the computing device 122 can identify the connecting device using a device identifier such as, for example, a MAC address, an IMSI, an IMEI, or other device identifier; a network identifier such as, for example, an IP address associated with the connecting device (e.g., a server 116), a network identifier associated with the connecting device, or the like; a user identifier or other identity such as, for example, an account number, user name, or other authentication information associated with the connecting device and/or a user thereof, or the like; other identifying information; combinations thereof; or the like.

Thus, operation 204 can include the computing device 122 performing various other operations to authenticate the user, device, or other entity associated with the connecting device, and/or querying other entities (e.g., a network edge device, router, or the like) for identifying information associated with the connecting device. Because the connecting device can be identified in additional and/or alternative manners, it should be understood that these examples are illustrative, and therefore should not be construed as being limiting in any way.

From operation 204, the method 200 can proceed to operation 206. At operation 206, the computing device 122 can determine if the connecting device is included on or in a device list 128 such as, for example, a rejected device list, an approved device list, or the like. Thus operation 206 can correspond to and/or can include the computing device 122 accessing a device list 128 and determining, based on the identity determined in operation 204, if the connecting device is on a device list 128 that allows and/or blocks access associated with the connecting device.

In some other embodiments, the computing device 122 can be configured to pass the identifying information associated with the connecting device to other entities to determine if the connecting device is included in or on a device list 128. Thus, operation 206 can include the computing device 122 triggering other entities to determine if the connecting device is on a device list 128. Because the connecting device can be determined to be on a device list 128 in additional and/or alternative manners, it should be understood that this example is illustrative, and therefore should not be construed as being limiting in any way.

If the computing device 122 determines, in operation 206, that the device 114 is on a device list 128, the method 200 can proceed to operation 208. At operation 208, the computing device 122 can determine if the connecting device should be rejected from connecting to the carrier network 112, or if some other operation should be performed (e.g., performing deep packet inspection on traffic associated with the connecting device). In some embodiments, operation 208 can correspond to the computing device 122 determining if the connecting device is included as a blocked device on a device list 128 and/or determining that the connecting device is not included as an allowed device on the device list 128. In some other embodiments, operation 208 can correspond to the computing device 122 determining if the connecting device is not included as a blocked device on a device list 128 and/or determining that the connecting device is included as an allowed device on the device list 128. Because the computing device 122 can determine that the connecting device should be rejected in additional and/or alternative manners, it should be understood that these example are illustrative, and therefore should not be construed as being limiting in any way.

If the computing device 122 determines, in operation 208, that the connecting device should be rejected, the method 200 can proceed to operation 210. At operation 210, the computing device 122 can reject the connection by the connecting device or perform another action such as, for example, invoking the deep packet inspection 130 to perform deep packet inspection on traffic associated with the connecting device. In some embodiments, the computing device 122 can reject the connection by the connecting device directly (e.g., by invoking the controller 126 and/or other entities associated with the carrier network 112). In some other embodiments, the computing device 122 can trigger the rejection of the connection by the connecting device by other entities (e.g., by other components or devices associated with the carrier network 112). Because the connection associated with the connecting device can be rejected in additional and/or alternative manners, it should be understood that these examples are illustrative, and therefore should not be construed as being limiting in any way.

If the computing device 122 determines, in operation 208, that the connecting device should not be rejected, the method 200 can proceed to operation 212. The method 200 also can proceed to operation 212 if the computing device 122 determines, in operation 206, that the connecting device is not on a device list 128. At operation 212, the computing device 122 can allow the connection requested by the connecting device. Of course, in some embodiments other operations may be performed on traffic associated with the connecting device such as, for example, deep packet inspection and the like. Thus, operation 212 can correspond to the computing device 122 allowing the connecting device to connect to the carrier network 112, the computing device 122 deciding not to block the connecting of the connecting device to the carrier network 112, invoking the deep packet inspection 130 on traffic associated with the connecting device, combinations thereof, and/or the like.

In some embodiments, the computing device 122 can allow the connection by the connecting device directly (e.g., by invoking the controller 126 and/or other entities associated with the carrier network 112 to allow the connection). In some other embodiments, the computing device 122 can trigger the allowing of the connection by the connecting device by other entities (e.g., by other components or devices associated with the carrier network 112). Because the connection associated with the connecting device can be allowed in additional and/or alternative manners, it should be understood that these examples are illustrative, and therefore should not be construed as being limiting in any way.

From operation 212, the method 200 can proceed to operation 214. At operation 214, the computing device 122 can initiate monitoring of the connecting device. According to various embodiments of the concepts and technologies disclosed herein, the computing device 122 can directly initiate monitoring of the connecting device. For example, the computing device 122 can invoke a monitoring application, service, module, or other entity such as the monitor 124 to monitor the connecting device and any traffic associated with the connecting device.

In some embodiments, monitoring the connecting device can include, for example, monitoring each data flow or data transmission that is associated with the connecting device. The data transmissions and/or flows can be monitored to determine source IP address(es), destination IP address(es), byte transmission counts and/or rates, packet transmission counts and/or rates, ratios of packets to bytes, byte rates, packet rates, packets per second, bytes per second, average packet size and/or flow length, duration of flows, numbers of flows, inter-arrival times, combinations thereof, or the like. Because other types of data associated with flows have been discussed herein, it should be understood that these examples are illustrative of only some aspects of flows that may be monitored. As such, these examples are illustrative and therefore should not be construed as being limiting in any way.

While the above paragraphs have discussed the monitoring of flows and/or other types of data transmissions associated with the connecting device, it should be understood that the resources to which the connecting device is connecting also can be configured to self-monitor and/or self-report. Thus, the monitoring of the connecting device can be performed by various entities associated with the carrier network 112 without departing from the scope of the embodiments of the concepts and technologies disclosed herein. According to various embodiments of operation 214, the monitoring of the connecting device can result in the creation of an instance of netflow data 110 as illustrated and described herein. It should be understood that this example is illustrative, and therefore should not be construed as being limiting in any way.

From operation 214, the method 200 can proceed to operation 216. At operation 216, the computing device 122 can trigger delivery of the netflow data 110. As explained above, the netflow data 110 can be provided to the netflow analysis service 108 on demand, upon creation, at certain time intervals, and/or at other times. Because the netflow data 110 can be provided at various times, it should be understood that these examples are illustrative, and therefore should not be construed as being limiting in any way.

In some embodiments, the computing device 122 can deliver the netflow data 110 to the netflow analysis service 108 directly. In some other embodiments, the computing device 122 can trigger one or more other devices to deliver the netflow data 110 to the netflow analysis service 108 (e.g., by components or devices associated with the carrier network 112). Because the netflow data 110 can be provided to the netflow analysis service 108 in additional and/or alternative manners, it should be understood that these examples are illustrative, and therefore should not be construed as being limiting in any way.

Although the above description of operations 208-210 of the method 200 has been described as using the device list 128 to reject connections by a connecting device, it should be understood that this is not the only action that can be taken in operation 210. In particular, as mentioned above, in some embodiments of the concepts and technologies disclosed herein, the computing device 122 can take other actions upon determining that a connecting device is included in or on a device list 128.

In some contemplated embodiments, for example, operation 208 can include the computing device 122 determining if some action should be taken with respect to the connecting device after determining that the connecting device is included in or on a device list 128 instead of, or in addition to, rejecting or allowing connections. Various embodiments of the action to be taken (e.g., at other embodiments of operation 210) can include performing deep packet inspection on traffic associated with the connecting device (e.g., by the deep packet inspection 130), protecting certain types of actions or activity associated with the connecting device (without blocking all connections), and/or taking other actions associated with the connecting device. In some such embodiments, where other action is taken in operation 210, the method 200 can flow from operation 210 to operation 214, and monitoring of activity of the connecting device can be performed as illustrated and described above. As such, it should be understood that the illustrated embodiment of the method 200 is illustrative and should not be construed as being limiting in any way.

From operation 216, the method 200 can proceed to operation 218. The method 200 can end at operation 218.

Figure 3:
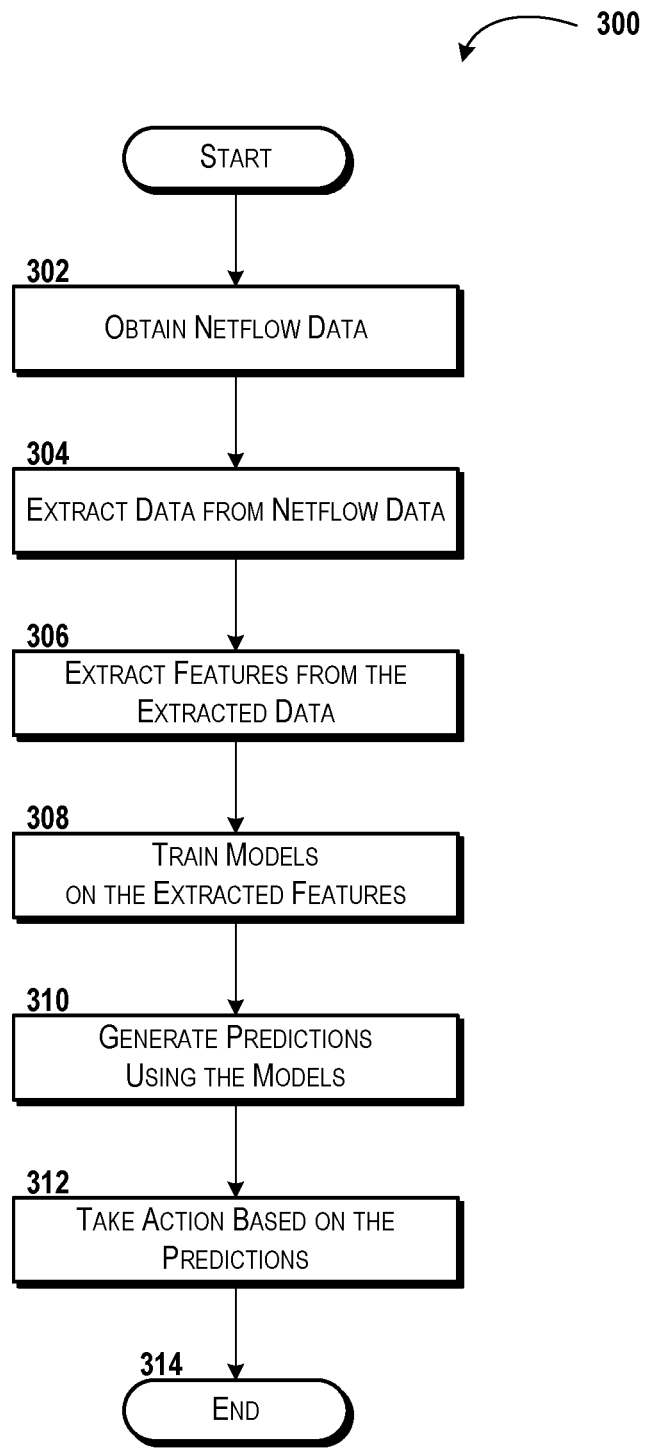
FIG. 3 is a flow diagram showing aspects of a method for creating and using learning models to identify botnet traffic, according to an illustrative embodiment of the concepts and technologies described herein.

Turning now to FIG. 3, aspects of a method 300 for creating and using learning models to identify botnet traffic will be described in detail, according to an illustrative embodiment. For purposes of illustrating and describing the concepts of the present disclosure, the method 300 is described herein as being performed by the server computer 102 via execution of one or more software modules such as, for example, the netflow analysis service 108. It should be understood that additional and/or alternative devices and/or network nodes can provide the functionality described herein via execution of one or more modules, applications, and/or other software including, but not limited to, the netflow analysis service 108. Thus, the illustrated embodiments are illustrative, and should not be viewed as being limiting in any way.

The method 300 begins at operation 302. At operation 302, the server computer 102 can obtain netflow data 110. As explained above, the netflow data 110 can be obtained by the server computer 102 in response to a request for the netflow data 110, in response to the monitor 124 or other entity associated with the carrier network 112 generating the netflow data 110, in response to the expiration of a time interval defined for reporting of the netflow data 110, and/or at other times. As explained above, the netflow data 110 can be obtained by the server computer 102 from the monitor 124 and/or from other entities associated with the carrier network 112.

From operation 302, the method 300 can proceed to operation 304. At operation 304, the server computer 102 can extract data from the netflow data 110 obtained in operation 302. According to various embodiments of the concepts and technologies disclosed herein, the server computer 102 can be configured to extract various types of data from the netflow data 110 such as, for example, mobility network data from various domains and/or device types (e.g., one or more Internet-of-things devices, one or more smartphones, one or more tablet devices, and/or or one or more other devices 114; one or more web servers, one or more application servers, and/or one or more other types of servers 116; one or more botnet devices 118; one or more other devices; etc.), other types of data, combinations thereof, or the like.

In various embodiments of the concepts and technologies disclosed herein, the type of data extracted can be instructive (to the server computer 102 and/or the netflow analysis service 108 executed or hosted thereby) as to the expected flows or transmissions that would be expected with a device associated with that type of data. For example, if an IoT device attempts to send multiple email messages simultaneously, the server computer 102 may determine that this IoT device is likely a botnet device such as one of the botnet devices 118 and/or a command and control server such as the server 116A.

As such, in operation 304, the server computer 102 can analyze the netflow data 110 and extract, from the netflow data 110, one or more data sets. In an example embodiment, a first data set can include only one type of mobility network data, and a second data set can include only a second type of mobility network data. Because other data sets can be generated from other types of data included in the netflow data 110, it should be understood that these examples are illustrative, and therefore should not be construed as being limiting in any way.

From operation 304, the method 300 can proceed to operation 306. At operation 306, the server computer 102 can extract features from the data extracted in operation 304. As explained herein in detail, the extracted features can be based on various aspects of source IP to destination IP flows or data transmissions. The extracted features can include, but are not limited to, a) a total number of bytes transmitted, b) a total number of packets transmitted, c) an average bytes per packet ratio for data transmitted, d) an average length of data transmitted, e) a number of dominant ratios in data transmitted, f) an average packet rate for data transmitted, g) an average byte rate for data transmitted, h) an average number of packets per second in data transmitted, i) an average number of bytes per second in data transmitted, j) a standard deviation of bytes to packets ratios in data transmitted, k) a dominant flow count in data transmitted, l) a total duration of a data transmission, m) a maximum duration of a data transmission, n) source ports associated with a data transmission, o) a destination port associated with a data transmission, p) a number of flows associated with a data transmission, q) an indication of whether a destination or a host initiated the connection used for the data transmission, r) a unique number of destination IP addresses associated with the data transmission, s) a periodicity for inter-arrival times (start times of successive flows) associated with a data transmission, t) average inter-arrival times of flows associated with a data transmission, u) a standard deviation of inter-arrival times (e.g., where a low standard deviation can imply a periodic data transmissions), and/or v) a standard deviation of packet counts. Because other data features can be extracted from the netflow data 110, it should be understood that these examples are illustrative, and therefore should not be construed as being limiting in any way.

From operation 306, the method 300 can proceed to operation 308. At operation 308, the server computer 102 can train models on the features extracted in operation 306. Thus, in some embodiments, operation 308 can correspond to the server computer 102 training a machine learning model and/or a deep learning model using the data features extracted in operation 306. In some embodiments of the concepts and technologies disclosed herein, the server computer 102 can be configured to train a machine learning model of the learning models 134 based on the extracted data features. According to some embodiments of the concepts and technologies disclosed herein, the machine learning model of the learning models 134 can include a random forest machine learning model. It should be understood that this example is illustrative, and therefore should not be construed as being limiting in any way.

In some embodiments of the concepts and technologies disclosed herein, the server computer 102 can be configured to train a deep learning model of the learning models 134 based on the extracted data features. According to some embodiments of the concepts and technologies disclosed herein, the deep learning model of the learning models 134 can include a weighted convolutional neural network. It should be understood that this example is illustrative, and therefore should not be construed as being limiting in any way.

From operation 308, the method 300 can proceed to operation 310. At operation 310, the server computer 102 can generate predictions using the learning models 134. As explained above, one or more signatures 132 associated with the connecting device can be compared to the learning models 134, used to filter the learning models 134, fed as input to the learning models 134, and/or otherwise used to determine if the signatures associated with the connecting device are associated with legitimate traffic (e.g., the devices 114 and/or a benign or legitimate server such as the server 116B) or malicious traffic (e.g., one of the botnet devices 118 and/or a command and control server such as the server 116A). Thus, operation 310 can correspond to the server computer 102 determining if the connecting device is a legitimate device or a malicious device.

The generating of predictions in operation 310 can also include, in some embodiments, categorization of the connecting device based on the netflow data 110. For example, operation 310 can include the server computer 102 categorizing the connecting device as a legitimate device (e.g., the devices 114 and/or a benign or legitimate server such as the server 116B) or an illegitimate device or malicious device (e.g., one of the botnet devices 118 and/or a command and control server such as the server 116A). Thus, operation 310 can include determining what type of device has connected to the carrier network 112 as illustrated and described herein. It should be understood that this example is illustrative, and therefore should not be construed as being limiting in any way.

From operation 310, the method 300 can proceed to operation 312. At operation 312, the server computer 102 can take an action based on the predictions in operation 310. In some embodiments, the action can include, for example, adding the connecting device to a device list 128, invoking deep packet inspection 130 to perform deep packet inspection on traffic associated with the connecting device, combinations thereof, or the like. As explained above, in some embodiments the device list 128 can include entries for legitimate devices such as the devices 114, and as such, adding the connecting device to the device list 128 can correspond to determining that the connecting device is a legitimate device. In some other embodiments, the device list 128 can include entries for malicious or illegitimate devices such as one of the botnet devices 118 and/or a command and control server such as the server 116A and/or other devices on the botnet 120 (not visible in FIG. 1).

As such, adding the connecting device to the device list 128 can correspond to determining that the connecting device is a malicious device. Although not separately shown in FIG. 3, the device list 128 can be delivered to the carrier network 112 or a component thereof (e.g., the controller 126 or other entities) for use in evaluating future connections or attempted connections to the carrier network 112.

As explained above, the device list 128 can be used to allow connections associated with devices on the device list 128, to reject connections associated with devices on the device list 128, and/or to take other actions associated with devices on the device list 128. For example, as noted above with reference to FIG. 2, a connecting device that is identified on a device list 128 may be subjected to additional monitoring and/or analysis such as, for example, deep packet inspection, insulation from certain networks and/or devices, limits on communications and/or connections, combinations thereof, or the like.

As such, it should be understood that the device list 128 can be used in a variety of manners according to various embodiments of the concepts and technologies disclosed herein. In some embodiments, for example, embodiments of the concepts and technologies disclosed herein can allow various traffic monitoring devices of a carrier network 112 to avoid performing deep packet inspection on all packets and/or flows in the carrier network 112.

Such embodiments can be configured to help reduce operational costs and performance since the carrier network 112 (and/or devices thereof) can be relieved of examining billions (or more) of IP address pairs to analyze attempted connections and/or analyzing billions of flows to perform costly (in terms of processing power and time) deep packet inspection. Instead, the use of the device list 128 can enable embodiments of the concepts and technologies disclosed herein to include a carrier network 112 that examines only flows and/or packets associated with devices on the device list 128. Because the device list 128 can be used in additional and/or alternative manners, and because additional advantages can be realized through implementing the concepts and technologies disclosed herein, it should be understood that the above examples are illustrative and should not be construed as being limiting in any way.

From operation 312 the method 300 can proceed to operation 314. The method 300 can end at operation 314.

Figure 4:
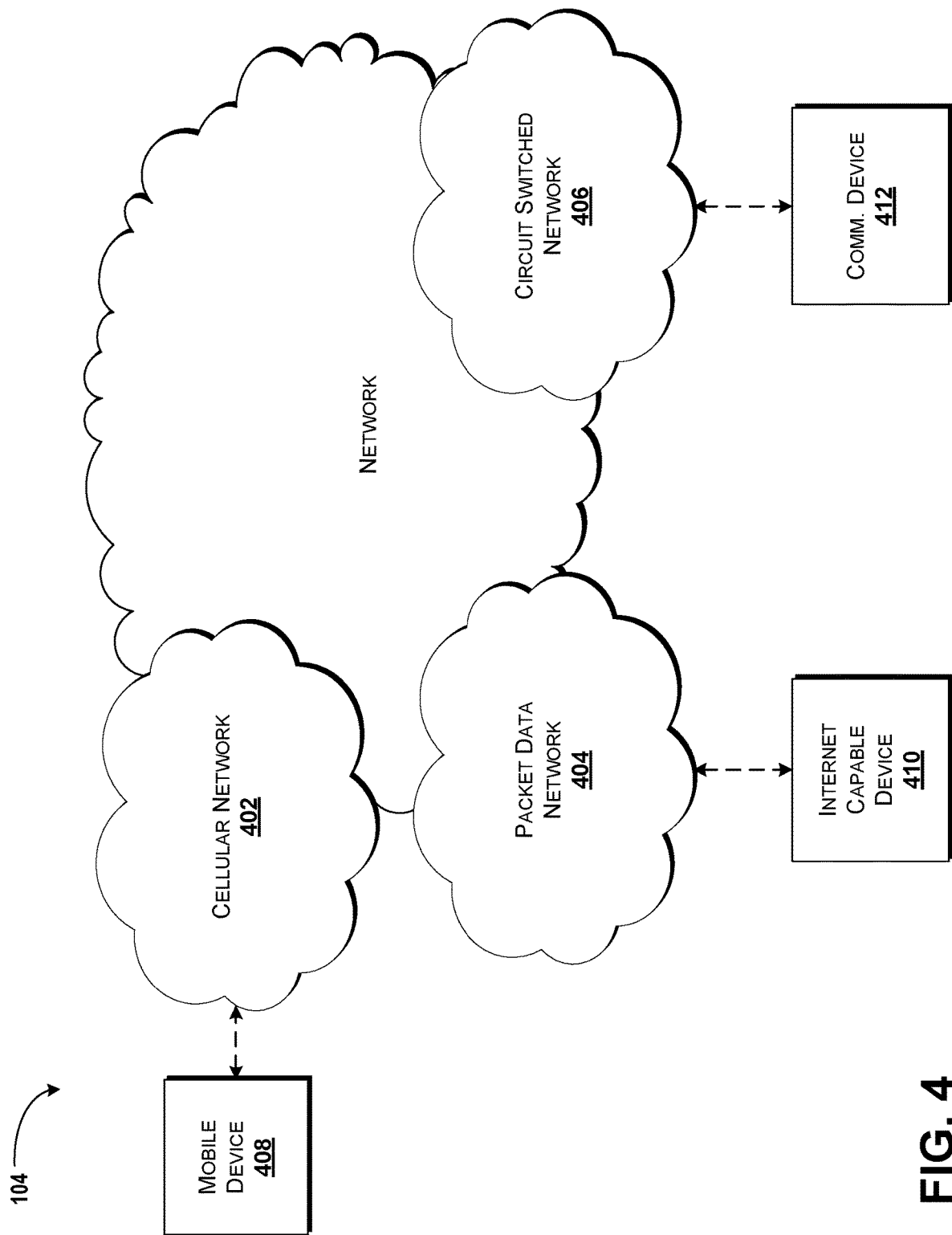
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G and 5G mobile communications standards, as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
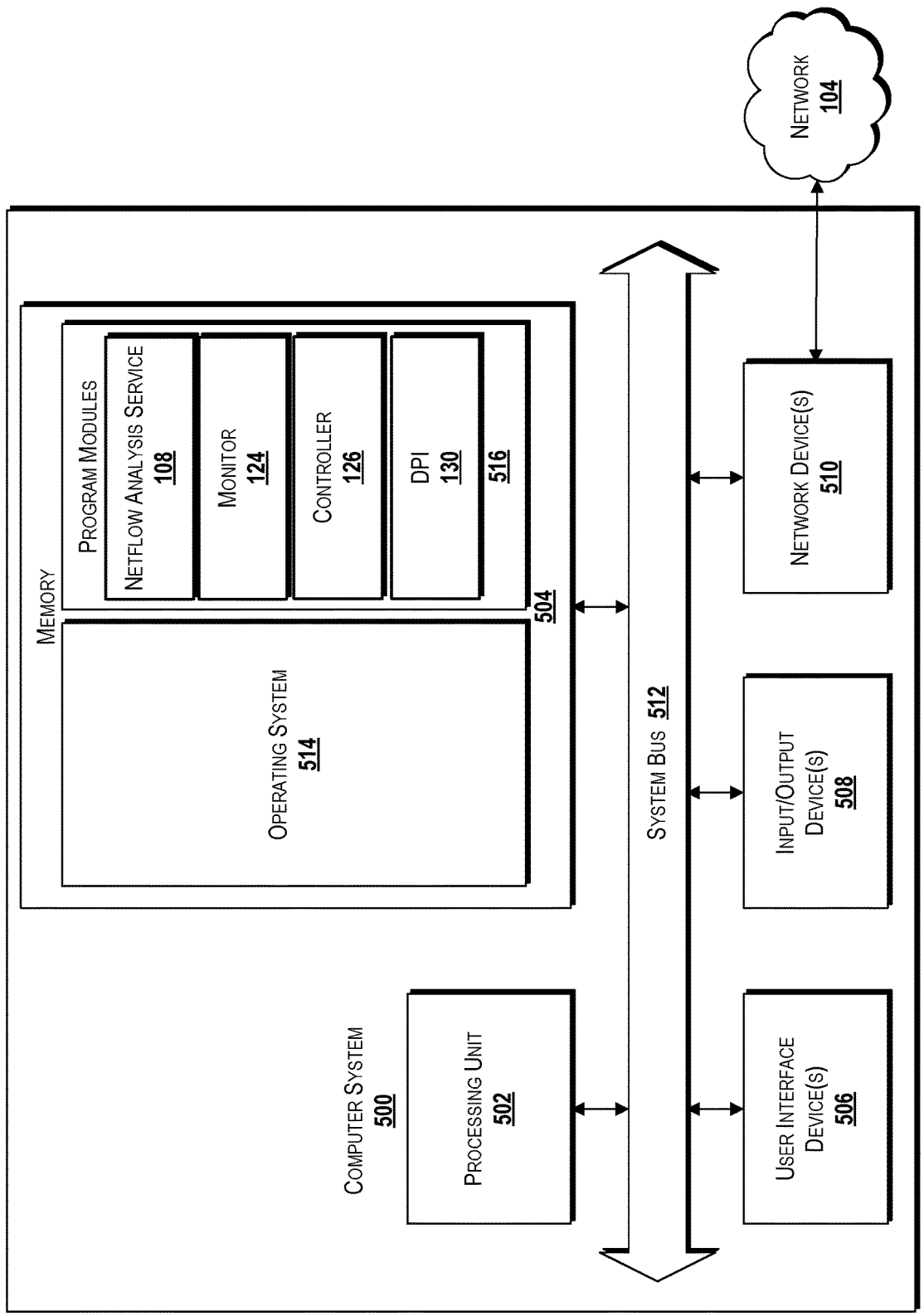
FIG. 5 is a block diagram illustrating an example computer system configured to creating and using learning models to identify botnet traffic, according to some illustrative embodiments of the concepts and technologies described herein.

FIG. 5 is a block diagram illustrating a computer system 500 configured to provide the functionality described herein for creating and using learning models to identify botnet traffic, in accordance with various embodiments of the concepts and technologies disclosed herein. Thus, it can be appreciated that the computer system 500 can correspond to the server computer 102, the computing device 122, and/or other devices illustrated and described herein such as, for example, the devices 114, one or more of the servers 116, and/or one or more of the botnet device 118. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the netflow analysis service 108, the monitor 124, the controller 126, and/or the deep packet inspection 130. These and/or other programs can be embodied in computer-readable media containing instructions that, when executed by the processing unit 502, perform one or more of the methods 200 and 300 described in detail above with respect to FIGS. 2-3 and/or other functionality as illustrated and described herein. It can be appreciated that, at least by virtue of the instructions embodying the methods 200 and 300 and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the netflow data 110, the device list 128, the signatures 132, the learning models 134, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
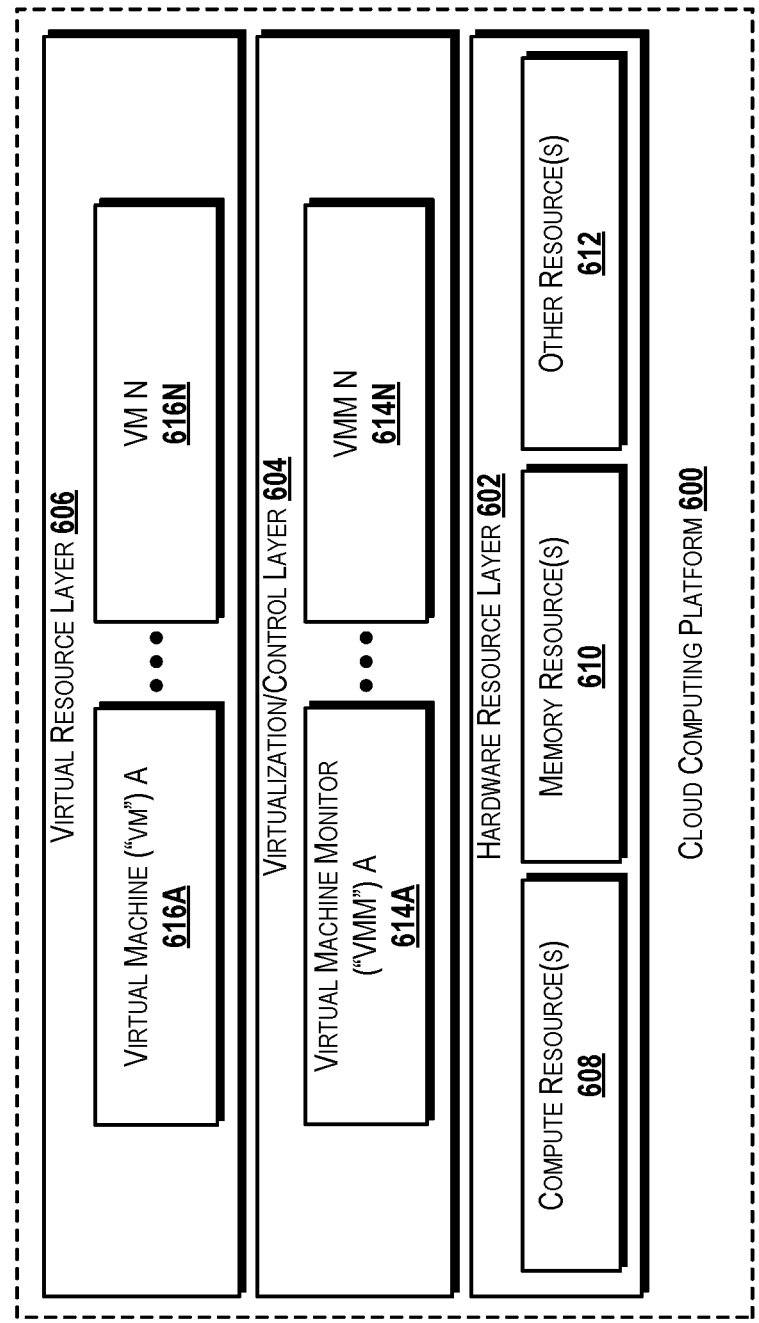
FIG. 6 is a diagram illustrating a carrier network capable of implementing aspects of the concepts and technologies disclosed herein, according to some illustrative embodiments of the concepts and technologies described herein.

FIG. 6 illustrates an illustrative architecture for a cloud computing platform 600 that can be capable of executing the software components described herein for creating and using learning models to identify botnet traffic and/or for interacting with the netflow analysis service 108. Thus, it can be appreciated that in some embodiments of the concepts and technologies disclosed herein, the cloud computing platform 600 illustrated in FIG. 6 can be used to provide the functionality described herein with respect to the server computer 102, the devices 114, the servers 116, the botnet devices 118, the computing device 122, and/or other devices illustrated and described herein.

The cloud computing platform 600 thus may be utilized to execute any aspects of the software components presented herein. Thus, according to various embodiments of the concepts and technologies disclosed herein, the netflow analysis service 108, the monitor 124, the controller 126, and/or the deep packet inspection 130, can be implemented, at least in part, on or by elements included in the cloud computing platform 600 illustrated and described herein. Those skilled in the art will appreciate that the illustrated cloud computing platform 600 is a simplification of but only one possible implementation of an illustrative cloud computing platform, and as such, the illustrated cloud computing platform 600 should not be construed as being limiting in any way.

In the illustrated embodiment, the cloud computing platform 600 can include a hardware resource layer 602, a virtualization/control layer 604, and a virtual resource layer 606. These layers and/or other layers can be configured to cooperate with each other and/or other elements of a cloud computing platform 600 to perform operations as will be described in detail herein. While connections are shown between some of the components illustrated in FIG. 6, it should be understood that some, none, or all of the components illustrated in FIG. 6 can be configured to interact with one another to carry out various functions described herein. In some embodiments, the components are arranged so as to communicate via one or more networks such as, for example, the network 104 illustrated and described hereinabove (not shown in FIG. 6). Thus, it should be understood that FIG. 6 and the following description are intended to provide a general understanding of a suitable environment in which various aspects of embodiments can be implemented, and should not be construed as being limiting in any way.

The hardware resource layer 602 can provide hardware resources. In the illustrated embodiment, the hardware resources can include one or more compute resources 608, one or more memory resources 610, and one or more other resources 612. The compute resource(s) 608 can include one or more hardware components that can perform computations to process data, and/or to execute computer-executable instructions of one or more application programs, operating systems, services, and/or other software including, but not limited to, the netflow analysis service 108, the monitor 124, and/or the controller 126 illustrated and described herein.

According to various embodiments, the compute resources 608 can include one or more central processing units ("CPUs"). The CPUs can be configured with one or more processing cores. In some embodiments, the compute resources 608 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 608 can include one or more discrete GPUs. In some other embodiments, the compute resources 608 can include one or more CPU and/or GPU components that can be configured in accordance with a co-processing CPU/GPU computing model. Thus, it can be appreciated that in some embodiments of the compute resources 608, a sequential part of an application can execute on a CPU and a computationally-intensive part of the application can be accelerated by the GPU. It should be understood that this example is illustrative, and therefore should not be construed as being limiting in any way.

In some embodiments, the compute resources 608 also can include one or more system on a chip ("SoC") components. It should be understood that the SoC component can operate in association with one or more other components as illustrated and described herein, for example, one or more of the memory resources 610 and/or one or more of the other resources 612. In some embodiments in which an SoC component is included, the compute resources 608 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 608 can be or can include one or more hardware components arranged in accordance with an ARM architecture, available for license from ARM HOLDINGS of Cambridge, United Kingdom. Alternatively, the compute resources 608 can be or can include one or more hardware components arranged in accordance with an x86 architecture, such as an architecture available from INTEL CORPORATION of Mountain View, California, and others. Those skilled in the art will appreciate the implementation of the compute resources 608 can utilize various computation architectures and/or processing architectures. As such, the various example embodiments of the compute resources 608 as mentioned hereinabove should not be construed as being limiting in any way. Rather, implementations of embodiments of the concepts and technologies disclosed herein can be implemented using compute resources 608 having any of the particular computation architecture and/or combination of computation architectures mentioned herein as well as other architectures.

Although not separately illustrated in FIG. 6, it should be understood that the compute resources 608 illustrated and described herein can host and/or execute various services, applications, portals, and/or other functionality illustrated and described herein. Thus, the compute resources 608 can host and/or can execute the netflow analysis service 108, the monitor 124, the controller 126, the deep packet inspection 130, and/or other applications or services illustrated and described herein.

The memory resource(s) 610 can include one or more hardware components that can perform or provide storage operations, including temporary and/or permanent storage operations. In some embodiments, the memory resource(s) 610 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 608, subject to the definition of "computer storage media" provided above (e.g., as excluding waves and signals per se and/or communication media as defined in this application).

Although not illustrated in FIG. 6, it should be understood that the memory resources 610 can host or store the various data illustrated and described herein including, but not limited to, the netflow data 110, the device list 128, the signatures 132, and/or the learning models 134, if desired. It should be understood that this example is illustrative, and therefore should not be construed as being limiting in any way.

The other resource(s) 612 can include any other hardware resources that can be utilized by the compute resources(s) 608 and/or the memory resource(s) 610 to perform operations. The other resource(s) 612 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 602 can be virtualized by one or more virtual machine monitors ("VMMs") 614A-614N (also known as "hypervisors;" hereinafter "VMMs 614"). The VMMs 614 can operate within the virtualization/control layer 604 to manage one or more virtual resources that can reside in the virtual resource layer 606. The VMMs 614 can be or can include software, firmware, and/or hardware that alone or in combination with other software, firmware, and/or hardware, can manage one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616").

Based on the foregoing, it should be appreciated that systems and methods for creating and using learning models to identify botnet traffic have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
obtaining, at a server computer that operates on a network and from a monitor operating on a carrier network, multiple instances of netflow data comprising a first instance of netflow data that is associated with a smartphone that is communicating with the carrier network, wherein the first instance of netflow data comprises mobility network data that represents communications between the carrier network and the smartphone, wherein the monitor generates the first instance of netflow data in response to detecting the smartphone communicating with the carrier network, wherein the communications comprise successive data transmissions, and wherein the carrier network identifies the smartphone using an international mobile equipment identity,
extracting, by the server computer and from the first instance of netflow data, data features associated with the communications, wherein the data features comprise statistical information associated with the communications, wherein the data features define netflow characteristics associated with the smartphone, and wherein the data features comprise a first feature defining a flow size feature of the communications, a second feature defining a flow feature of the communications, and a third feature defining a beacon feature of the communications, the flow size feature comprising a standard deviation of a bytes to packets ratio for the communications, the data features comprising a number of unique destination IP addresses associated with the communications, and the beacon feature comprising average inter-arrival times of flows associated with the communications, a standard deviation of inter-arrival times of the flows associated with the communications, and a standard deviation of packet counts associated with the flows associated with the communications,
generating, by the server computer and based on the data features, a statistical signature for the smartphone, the statistical signature representing the communications and connections of the smartphone during the communications,
training, by the server computer, a learning model based on data features extracted from multiple instances of netflow data comprising the first instance of netflow data,
providing, by the server computer and to the learning model, the statistical signature for the smartphone as input to the learning model,
obtaining, by the server computer and from the learning model, output provided by the learning model, wherein the learning model provides the output based on the input of the statistical signature to the learning model, and wherein the learning model generates a prediction based on the output, the prediction indicating if the smartphone is a botnet device or if the smartphone is not the botnet device, and
in response to the prediction indicating that the smartphone is the botnet device:
adding, by the server computer, the smartphone to a device list that identifies malicious devices, and
triggering, by the server computer, delivery of the device list to a controller operating on the carrier network, wherein the device list is used by the controller to perform deep packet inspection on future communications associated with the smartphone, and
in response to the prediction indicating that the smartphone is not the botnet device:
adding, by the server computer, the smartphone to a further device list that identifies legitimate devices, and
triggering, by the server computer, delivery of the device list to the controller to cause the controller to allow the future communications associated with the smartphone.

2. The system of claim 1, wherein the data features further comprise a total number of bytes transmitted during the communications, a maximum duration of the communications, source ports associated with the communications, a destination port associated with the communications, and a total number of packets transmitted during the communications.

3. The system of claim 1, wherein the data features further comprise an average number of packets per second transmitted during the communications, an average number of bytes per second transmitted during the communications, a number of flows associated with the communications, and an indication of whether a destination initiated a connection used for the communications or if a host initiated the connection used for the communications.

4. The system of claim 1, wherein the learning model comprises a weighted convolutional neural network.

5. The system of claim 1, wherein the smartphone communicates with the network via the carrier network.

6. The system of claim 1, wherein the beacon feature further comprises a periodicity for inter-arrival times between the successive data transmissions.

7. The system of claim 1, further comprising the controller, wherein the controller is configured to:
detect the communications associated with the smartphone;
identify the smartphone using the international mobile equipment identity;
determine if the smartphone is on the device list; and
in response to determining that the smartphone is on the device list, initiate the deep packet inspection of a packet flow associated with the smartphone, whereby the deep packet inspection is performed on the communications based on the learning model.

8. A method comprising:
obtaining, at a server computer comprising a processor and from a monitor operating on a carrier network, multiple instances of netflow data comprising a first instance of netflow data that is associated with a smartphone that is communicating with the carrier network, wherein the first instance of netflow data comprises mobility network data that represents communications between the carrier network and the smartphone, wherein the monitor generates the first instance of netflow data in response to detecting the smartphone communicating with the carrier network, wherein the communications comprise successive data transmissions, wherein the carrier network identifies the smartphone using an international mobile equipment identity, and wherein the server computer operates on a network;
extracting, by the server computer and from the first instance of netflow data, data features associated with the communications, wherein the data features comprise statistical information associated with the communications, wherein the data features define netflow characteristics associated with the smartphone, and wherein the data features comprise a first feature defining a flow size feature of the communications, a second feature defining a flow feature of the communications, and a third feature defining a beacon feature of the communications, the flow size feature comprising a standard deviation of a bytes to packets ratio for the communications, the data features comprising a number of unique destination IP addresses associated with the communications, and the beacon feature comprising average inter-arrival times of flows associated with the communications, a standard deviation of inter-arrival times of the flows associated with the communications, and a standard deviation of packet counts associated with the flows associated with the communications;
generating, by the server computer and based on the data features, a statistical signature for the smartphone, the statistical signature representing the communications and connections of the smartphone during the communications;
training, by the server computer, a learning model based on data features extracted from multiple instances of netflow data comprising the first instance of netflow data;
providing, by the server computer and to the learning model, the statistical signature for the smartphone as input to the learning model;
obtaining, by the server computer and from the learning model, output provided by the learning model, wherein the learning model provides the output based on the input of the statistical signature to the learning model, and wherein the learning model generates a prediction based on the output, the prediction indicating if the smartphone is a botnet device or if the smartphone is not the botnet device;
in response to the prediction indicating that the smartphone is the botnet device:
adding, by the server computer, the smartphone to a device list that identifies malicious devices, and
triggering by the server computer, delivery of the device list to a controller operating on the carrier network, wherein the device list is used by the controller to perform deep packet inspection on future communications associated with the smartphone; and
in response to the prediction indicating that the smartphone is not the botnet device:
adding, by the server computer, the smartphone to a further device list that identifies legitimate devices, and
triggering by the server computer, delivery of the device list to the controller to cause the controller to allow the future communications associated with the smartphone.

9. The method of claim 8, wherein the data features further comprise a total number of bytes transmitted during the communications, a maximum duration of the communications, source ports associated with the communications, a destination port associated with the communications, and a total number of packets transmitted during the communications.

10. The method of claim 8, wherein the data features further comprise an average number of packets per second transmitted during the communications, an average number of bytes per second transmitted during the communications, a number of flows associated with the communications, and an indication of whether a destination initiated a connection used for the communications or if a host initiated the connection used for the communications.

11. The method of claim 8, wherein the learning model comprises a weighted convolutional neural network.

12. The method of claim 8, wherein the smartphone communicates with the network via the carrier network.

13. The method of claim 8, wherein the beacon feature further comprises a periodicity for inter-arrival times between the successive data transmissions.

14. The method of claim 13, wherein the monitor is configured to monitor the communications associated with the smartphone, wherein the monitor is invoked by the controller, and wherein the controller is configured to:
detect the communications associated with the smartphone;
identify the smartphone using the international mobile equipment identity;
determine if the smartphone is on the device list; and
in response to determining that the smartphone is on the device list, initiate the deep packet inspection of a packet flow associated with the smartphone, whereby the deep packet inspection is performed on the communications based on the learning model.

15. A computer storage medium having computer-executable instructions stored thereon that, when executed by a processor, cause the processor to perform operations comprising:
obtaining, at a server computer that operates on a network and from a monitor operating on a carrier network, multiple instances of netflow data comprising a first instance of netflow data that is associated with a smartphone that is communicating with the carrier network, wherein the first instance of netflow data comprises mobility network data that represents communications between the carrier network and the smartphone, wherein the monitor generates the first instance of netflow data in response to detecting the smartphone communicating with the carrier network, wherein the communications comprise successive data transmissions, and wherein the carrier network identifies the smartphone using an international mobile equipment identity;

extracting, by the server computer and from the first instance of netflow data, data features associated with the communications, wherein the data features comprise statistical information associated with the communications, wherein the data features define netflow characteristics associated with the smartphone, and wherein the data features comprise a first feature defining a flow size feature of the communications, a second feature defining a flow feature of the communications, and a third feature defining a beacon feature of the communications, the flow size feature comprising a standard deviation of a bytes to packets ratio for the communications, the data features comprising a number of unique destination IP addresses associated with the communications, and the beacon feature comprising average inter-arrival times of flows associated with the communications, a standard deviation of inter-arrival times of the flows associated with the communications, and a standard deviation of packet counts associated with the flows associated with the communications;

generating, by the server computer and based on the data features, a statistical signature for the smartphone, the statistical signature representing the communications and connections of the smartphone during the communications;

training, by the server computer, a learning model based on data features extracted from multiple instances of netflow data comprising the first instance of netflow data;

providing, by the server computer and to the learning model, the statistical signature for the smartphone as input to the learning model;

obtaining, by the server computer and from the learning model, output provided by the learning model, wherein the learning model provides the output based on the input of the statistical signature to the learning model, and wherein the learning model generates a prediction based on the output, the prediction indicating if the smartphone is a botnet device or if the smartphone is not the botnet device;

in response to the prediction indicating that the smartphone is the botnet device:
  adding, by the server computer, the smartphone to a device list that identifies malicious devices, and
  triggering, by the server computer, delivery of the device list to a controller operating on the carrier network, wherein the device list is used by the controller to perform deep packet inspection on future communications associated with the smartphone; and in response to the prediction indicating that the smartphone is not the botnet device:
  adding, by the server computer, the smartphone to a further device list that identifies legitimate devices, and
  triggering, by the server computer, delivery of the device list to the controller to cause the controller to allow the future communications associated with the smartphone.

16. The computer storage medium of claim 15, wherein the data features further comprise a total number of bytes transmitted during the communications, a maximum duration of the communications, source ports associated with the communications, a destination port associated with the communications, and a total number of packets transmitted during the communications.

17. The computer storage medium of claim 15, wherein the data features further comprise an average number of packets per second transmitted during the communications, an average number of bytes per second transmitted during the communications, a number of flows associated with the communications, and an indication of whether a destination initiated a connection used for the communications or if a host initiated the connection used for the communications.

18. The computer storage medium of claim 15, wherein the learning model comprises a weighted convolutional neural network.

19. The computer storage medium of claim 15, wherein the smartphone communicates with the network via the carrier network.

20. The computer storage medium of claim 15, wherein the beacon feature further comprises a periodicity for inter-arrival times between the successive data transmissions.

* * * * *